US006928548B1

(12) United States Patent
Hale et al.

(10) Patent No.: US 6,928,548 B1
(45) Date of Patent: Aug. 9, 2005

(54) SYSTEM AND METHOD FOR VERIFYING THE INTEGRITY OF STORED INFORMATION WITHIN AN ELECTRONIC DEVICE

(75) Inventors: Robert P. Hale, Portland, OR (US); Andrew J. Fish, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 621 days.

(21) Appl. No.: 09/675,113

(22) Filed: Sep. 29, 2000

(51) Int. Cl.[7] ............................ G06F 11/30; G06F 12/14
(52) U.S. Cl. ....................................................... 713/187
(58) Field of Search ................................. 713/187, 197

(56) References Cited

U.S. PATENT DOCUMENTS

| | | | | |
|---|---|---|---|---|
| 4,558,176 A | * | 12/1985 | Arnold et al. | 713/190 |
| 4,562,305 A | * | 12/1985 | Gaffney, Jr. | 713/190 |
| 4,796,181 A | * | 1/1989 | Wiedemer | 705/52 |
| 5,421,006 A | * | 5/1995 | Jablon et al. | 714/36 |
| 5,643,086 A | | 7/1997 | Alcorn et al. | |
| 5,802,592 A | * | 9/1998 | Chess et al. | 711/164 |
| 5,916,308 A | * | 6/1999 | Duncan et al. | 709/331 |
| 6,401,208 B2 | * | 6/2002 | Davis et al. | 713/193 |

FOREIGN PATENT DOCUMENTS

| | | |
|---|---|---|
| EP | 0 902 364 A1 | 3/1999 |
| WO | WO 00/33196 | 6/2000 |

OTHER PUBLICATIONS

Hewlett–Packard, "Integrated Lights–Out Security", Hewlett–Packard Development Company, L.P., 2004,technology brief, entire document, particularly pp. 3–17.*

3Com Corp., "FIPS 140–2 Security Policy" for 3Com 10/100 Secure NIC/ 100 Secure Fiber NIC, 3Com Corp., 2003, entire document.*

Intel Corporation, "Intel(R) Protected Access Architecture", Mar. 2001, Intel Corporation, Rev 1.0, entire deocument.*

Applied Cryptography, Second Edition, "Protocols, Algorithms, and Source Code in C," Bruce Schneier, pp. 483–502.

* cited by examiner

Primary Examiner—Gilberto Barron, Jr.
Assistant Examiner—Ronald Baum
(74) Attorney, Agent, or Firm—Blakely, Sokoloff, Taylor & Zafman LLP

(57) ABSTRACT

In one embodiment, a digitally signed image is embodied in a memory component such as a non-volatile memory. The digitally signed image comprises a post-relocation image and a digital signature. The post-relocation image is an image of a software module altered by a symmetrical relocation function by loading of the image into the memory component. The digital signature is based on the image so that it can be used to analyze data integrity.

17 Claims, 7 Drawing Sheets

SYSTEM AND METHOD FOR VERIFYING THE INTEGRITY OF STORED INFORMATION WITHIN AN ELECTRONIC DEVICE

FIELD

The present invention relates to the field of data security. More particularly, this invention relates to a scheme for verifying the integrity of stored information loaded within an electronic device.

GENERAL BACKGROUND

Many electronic devices include a set of semi-permanently stored instructions referred to as firmware. For instance, computers include a type of firmware referred to as the basic input/output system (BIOS). Being executed by a processor of the computer, the BIOS is coded to perform various functions. For example, during a pre-boot cycle at power-up, the BIOS controls the initialization of the computer as well as the initialization of various hardware peripherals. Normally provided by a single vendor, the BIOS is loaded into pre-boot space of a non-volatile memory such as a read-only memory (ROM) component or a flash memory component during manufacture of the computer.

Recently, however, it has become desirable to store more sophisticated routines and data in the pre-boot space of the non-volatile memory. As an example, in recent efforts to protect against software viruses and malicious corruption of the BIOS, an image of the BIOS code may be digitally signed to produce a digital signature. Prior to execution of the BIOS, the digital signature may be used to determine whether the BIOS has been modified. This provides much needed virus protection.

Well known in the art, a digital signature is digital data signed using a private key of its signatory. Similar to encryption, the "signing process" may be accomplished using any of a number of software algorithms such as a Rivert Shamir and Adleman (RSA) algorithm or the Digital Signature Algorithm (DSA) 30 as set forth in a Federal Information Processing Standards publication 186 entitled "Digital Signature Standard" (May 19, 1994). Normally, the digital data is placed in an encoded form (referred to as the "hash value"), achieved by performing a one-way hash operation on the original digital data, prior to signing the hash value. The term "one-way" indicates that there does not readily exist an inverse operation or function to recover any discernible portion of the digital data from the hash value.

Recently, the computer industry has made efforts to develop BIOS as a collection of software modules produced by different vendors rather than a piece of monolithic code produced by a single vendor. It is likely that the code of the BIOS modules would be configured as "execute-in-place" modules because this code would be executed before the availability of system random access memory (RAM). Also, it is likely that relocation would be used to properly load the BIOS modules within the non-volatile memory because it would be too difficult for all of the BIOS vendors to agree on the specific addressing scheme beforehand.

As commonly known in the industry, "relocation" is a process by which addresses within each BIOS module are adjusted based on the particular address location in memory allotted for the BIOS module (referred to as the "base address"). Thus, software routines within a BIOS module are usually coded with relative offsets from a base address that has not yet been assigned. During relocation, the addresses of various software routines within the BIOS module would be adjusted by adding the base address to each of the relative offsets.

Unfortunately, if relocation is performed on the execute-in-place BIOS modules, any digital signatures associated with the images of the BIOS modules would be ineffective because any data integrity analysis using the digital signatures would indicate that the BIOS module has been modified. Hence, it is virtually impossible to determine whether modification of the BIOS module was unauthorized or merely due to the relocation operation. Thus, it would be desirable to develop an integrity verification mechanism that improves the effectiveness of digital signatures in detecting unauthorized modifications to the BIOS module while still allowing the image to undergo relocation.

Moreover, when BIOS is developed as a collection of digitally signed BIOS modules produced by different vendors, in certain situations, it may be desirable to dynamically link these digitally signed modules. In particular, one BIOS module may be configured to make a call for a function coded in another BIOS module. However, in order to dynamically link the BIOS modules together, it would require modification of at least one BIOS module, which would invalidate any digital signature associated with the image of that BIOS module. Thus, the original digital signatures would not be effective to identifying unauthorized modification of the module. Thus, an integrity verification mechanism that overcomes this problem would be desirable.

BRIEF DESCRIPTION OF THE DRAWINGS

The features and advantages of the present invention will become apparent from the following detailed description of the present invention in which.

DETAILED DESCRIPTION OF THE INVENTION

Figure 1:
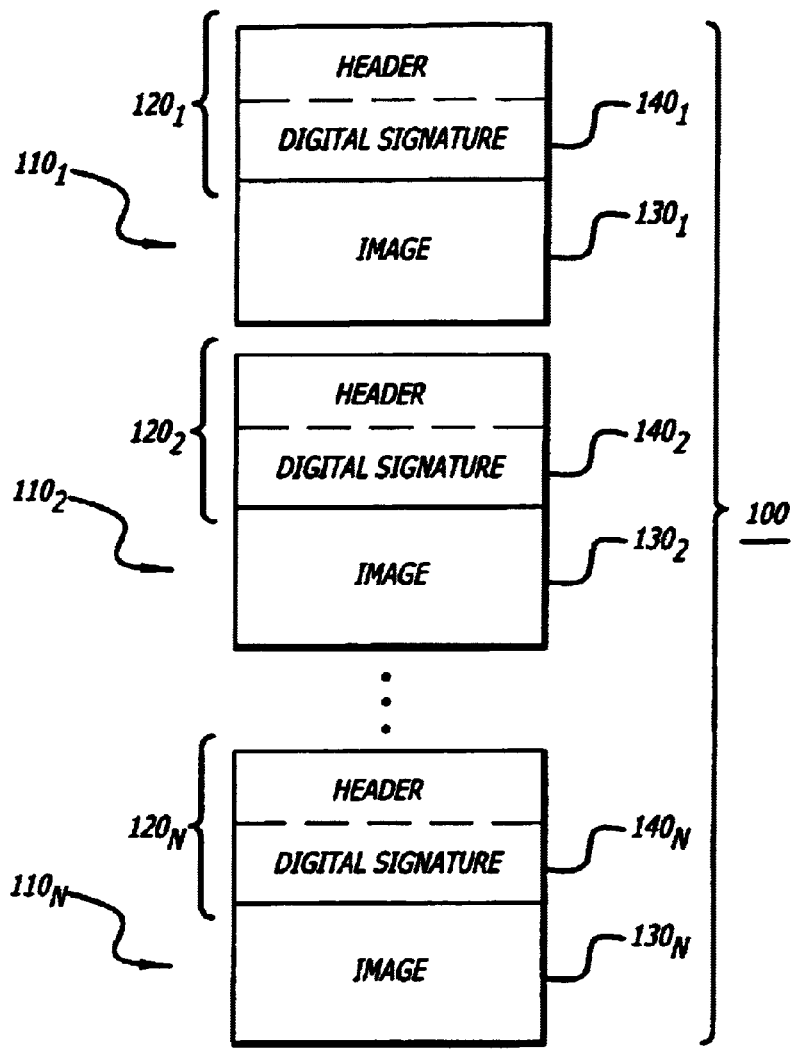
FIG. 1 is an illustrative block diagram of a collection of software modules for loading as firmware into an electronic device.

Herein, certain embodiments of the invention are described for verifying the integrity of information that is stored within an electronic device during preboot operations. In general, the stored information may include, for example, a digitally signed image that includes a post-relocation image of a software module or is dynamically linked with another digitally signed image.

In the following description, certain terminology is used to discuss features of the present invention. A "software module" comprises a set of instructions that perform a particular function. For example, the software module may feature instructions that are executed during a pre-boot cycle in order to initialize an electronic device. A replication of a binary representation of the instructions associated with the software module is referred to as an "image". Different types of images can be used to represent different formatting stages. For instance, a "pre-relocation image" is a binary representation of the software module prior to conducting a relocation operation thereon. A "post-relocation image" is a binary representation of the module after relocation.

Furthermore, an "electronic device" is a combination of electronic hardware and software that collectively operates to perform one or more specific functions. Examples of an electronic device include a computer (e.g., a laptop, desktop, hand-held, server, mainframe, etc.), a component of the computer (e.g., a serial port), a cellular telephone, a set-top box (cable box, network computer, satellite television receiver, etc.), a network appliance and the like. A "link" is broadly defined as one or more information-carrying mediums to establish a communication pathway, including physical medium (e.g., electrical wire, optical fiber, cable, bus traces, etc.) or wireless medium (e.g., air in combination with wireless signaling technology).

Briefly, one integrity verification mechanism involves the configuration of a digitally signed image to include relocation information, a post-relocation image and a digital signature. The "relocation information" is a series of relative offsets from a base address. These offsets are generated after the stored information (e.g., an image of a software module) is compiled and placed into an executable format such as an MS-DOS® "EXE" format (MS-DOS is a registered trademark of Microsoft Corporation of Redmond, Wash.). The offsets are converted to appropriate addresses during relocation when the base address, namely the storing address at which the image of the software module is stored and retrieved for execution, is determined. Thus, the post-relocation image differs from a pre-relocation image. The digital signature, however, is based on the pre-relocation image.

Another second integrity verification mechanism involves the inclusion of an import table and an export table within each digitally signed image. These tables allow functions within different digitally signed images to be dynamically bound together via a Bound & Relocated Import Table (BRIT). The BRIT resides outside the digitally signed image. Both of the integrity verification mechanisms may be performed by hardware or a software program embedded in a processor (described below) or simply executable by the processor.

Referring to FIG. 1, an illustrative block diagram of a collection of "N" software modules ready for loading as firmware 100 into an electronic device is shown. Herein, each software module $110_N$ (N≧1) includes a header $120_N$ and an image $130_N$ for a particular software segment of the firmware 100. Prior to loading the software modules as firmware into a non-volatile memory as described below, each image $130_N$ is digitally signed by a signatory to produce a digital signature $140_N$. The signatories may differ between each module or multiple modules may share the same signatory. A "signatory" may include any person or entity in a position of trust to guarantee or sponsor the digital signature (e.g., a bank, governmental entity, trade association, original equipment manufacturer, vendor, etc.).

Figure 2:
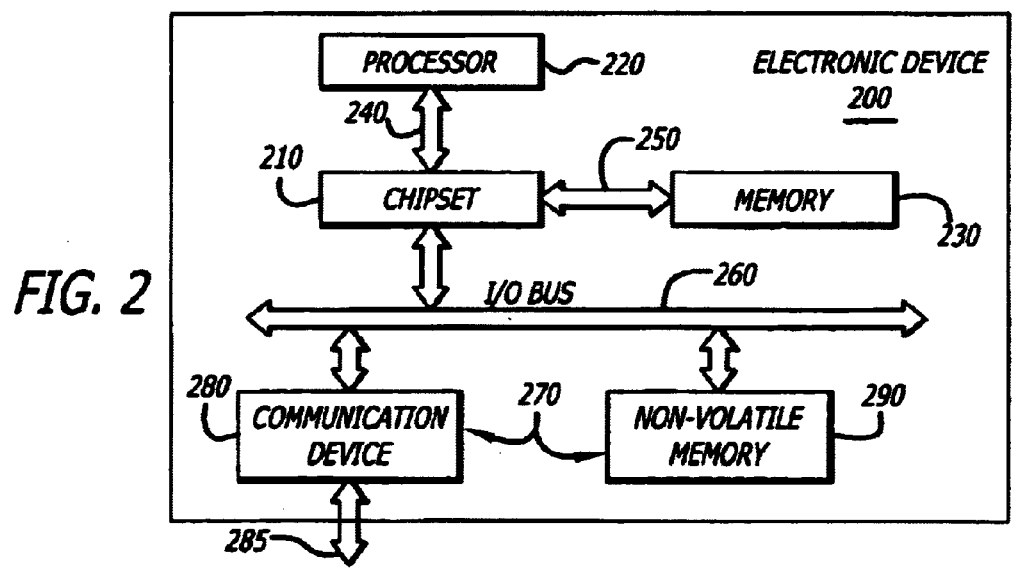
FIG. 2 is an illustrative block diagram of an embodiment of an electronic device utilizing the present invention.

Referring now to FIG. 2, an illustrative block diagram of an embodiment of an electronic device is shown. For this embodiment, the electronic device 200 comprises a chipset 210 coupled to a processor 220 and a memory 230 through a first bus 240 and a second bus 250, respectively. In addition, chipset 210 is coupled to a third bus 260 that provides a pathway to one or more system resources 270. Herein, the third bus 260 is represented as an input/output (I/O) bus (e.g., Peripheral Component Interconnect "PCI" bus); however, any other type of bus architecture may be used, including such bus architectures as Industry Standard Architecture (ISA), Extended ISA (EISA), Universal Serial Bus (USB) and the like. Herein, the third bus 260 is shown as a single bus, but it is contemplated that the third bus 260 may include multiple buses coupled together through bridge circuitry.

As shown, the system resources 270 would be coupled to at least one of the multiple buses. The system resources 270 comprise a communication device 280 and a non-volatile memory component 290. Communication device 280 is configured to establish communications with another electronic device over a communication link 285. Examples of communication device 280 include a network interface card, a modem card or an external modem. The non-volatile memory component 290 includes firmware that features digitally signed images of one or more software modules. In one embodiment, one or more of these software modules may form a Basic Input/Output System (BIOS) code of the electronic device 200. Examples of the non-volatile memory component 290 include a programmable, non-volatile memory such as flash memory, battery-backed random access memory (RAM), read only memory (ROM), erasable programmable ROM (EPROM), electrically erasable PROM (EEPROM), or any other type of memory appropriate for storing the module(s).

Figure 3:
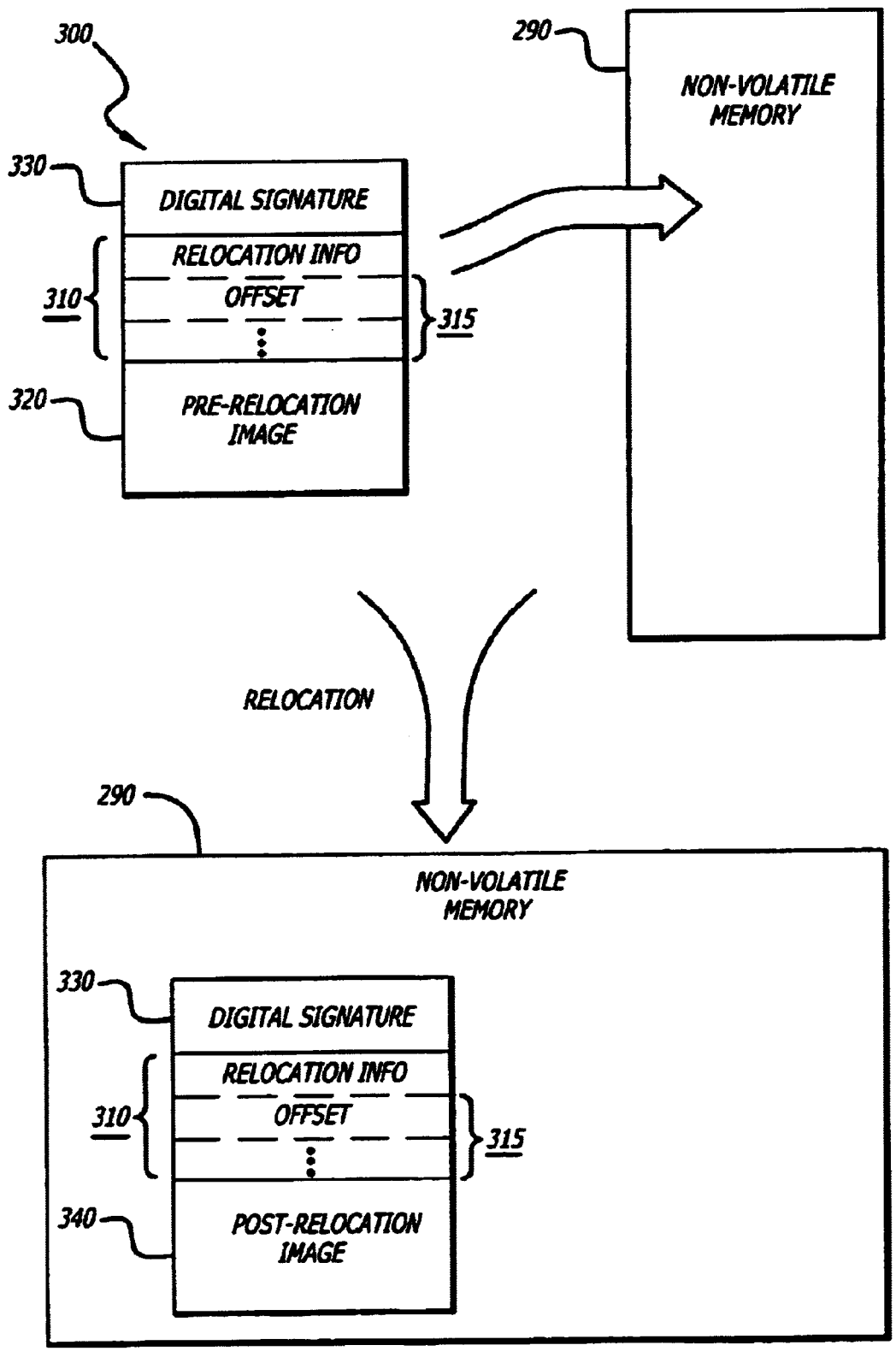
FIG. 3 is a block diagram of a first illustrative embodiment of the contents of the non-volatile memory component of FIG. 2 that are collectively used to verify the integrity of relocated, post-relocation images using digital signatures.

Referring to FIG. 3, a block diagram of a first illustrative embodiment of the loading and storage contents of the non-volatile memory component 290 of FIG. 2 is shown. The non-volatile memory component 290 is loaded with one or more digitally signed images 300, which collectively act as firmware. With respect to this embodiment, a digitally signed image 300 includes relocation information 310, a pre-relocation image 320 and a digital signature 330. The positioning of the elements forming any image is a design choice.

The relocation information 310 includes relative offsets 315 for certain routines within the pre-relocation image 310. Normally, the offsets 315 are generated when the software module associated with the digitally signed image is compiled. The offsets 315 are used for properly addressing segments of information within the software module during relocation once the starting location of the image 300, referred to as base address "B_ADDR," is determined. The relocation is conducted by a symmetrical relocation function that allows the relocated information to be undone for data integrity verification using the digital signature 330.

Herein, during relocation, the pre-relocation image 320 is converted (relocated) to a post-relocation image 340 is based on the pre-relocation image 320 of the image 300 during loading. Namely, the pre-relocation image 320 is relocated for retrieval from the base address (B_ADDR) allotted to the image 300. In essence, the relocation operation adds B_ADDR to the offsets 315 contained within the relocation information 310. This modifies the binary image such as the post-relocation image 340 stored in the non-volatile memory component now differs from the pre-relocation image 320 coded by the vendor.

The digital signature 330 includes at least a hash value of the pre-relocation image 320, which is digitally signed with a private key (PRK) of a signatory. Although the post-relocation image 340 now resides in the non-volatile memory component after relocation, it is appreciated that the digital signature 330 is based on the pre-relocated image 320 which is the binary form as originally produced before loading into the non-volatile memory component.

Figure 4:
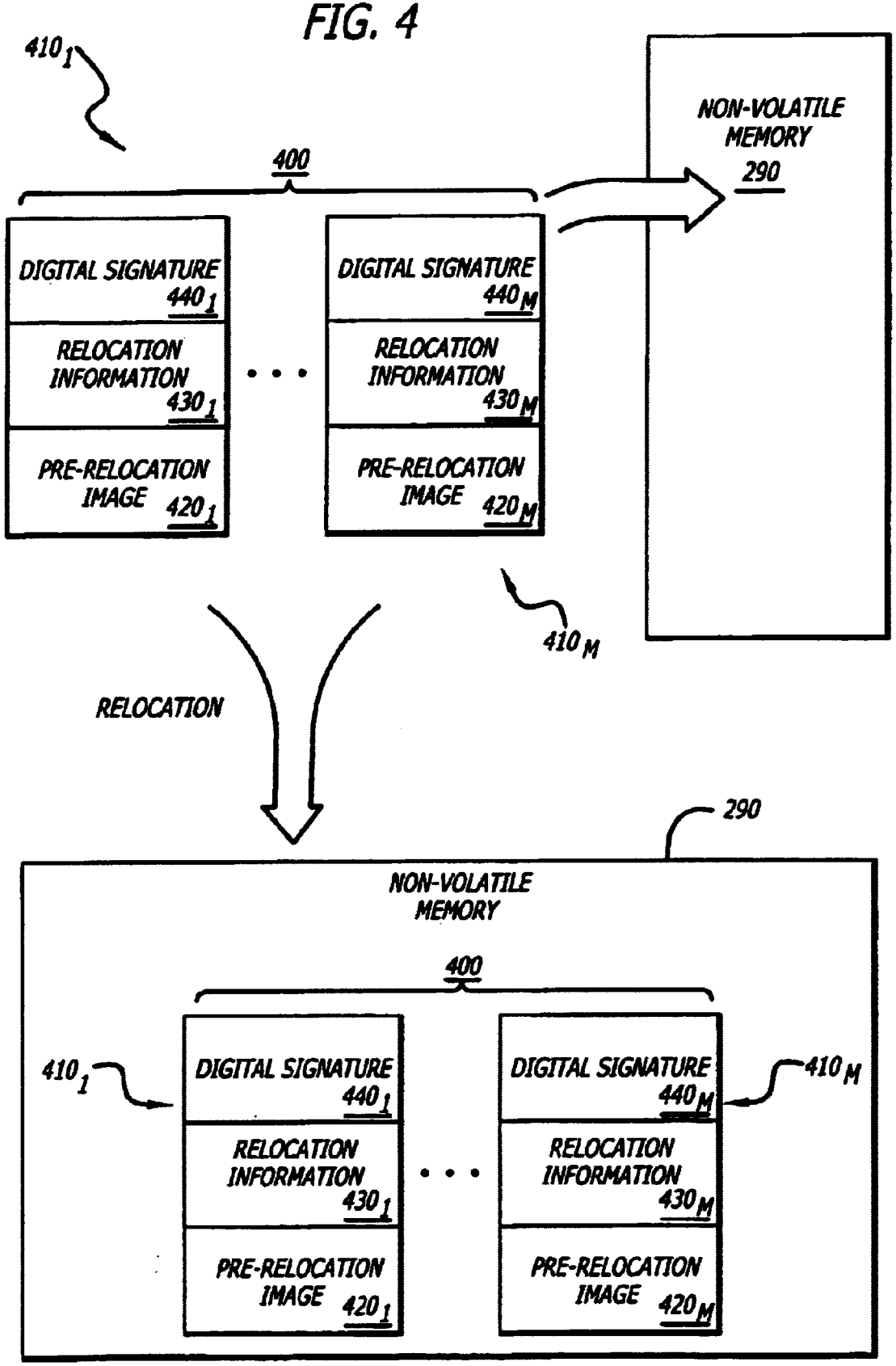
FIG. 4 is a block diagram of a second illustrative embodiment of the contents of the non-volatile memory component of FIG. 2.

Referring to FIG. 4, a block diagram of a second illustrative embodiment of the contents of the non-volatile memory component 290 is shown. The non-volatile memory component 290 contains multiple digitally signed images $410_1$–$410_M$ ("M" being a positive whole number) forming the firmware 400 (e.g., the BIOS). For instance, as an illustrative example, each digitally signed image $410_1$–$410_M$ is formed with a pre-relocation image $420_1$–$420_M$, relocation information $430_1$–$430_M$ and a digital signature $440_1$–$440_M$. Each digital signature $400_1$–$400_M$ is based on at least a hash value of its corresponding pre-relocation image $420_1$–$420_M$ and is digitally signed with a private key (PRK) of one or more signatories. Upon being loaded -with the digitally signed images $410_1$–$410_M$, the non-volatile memory component 290 undergoes a relocation operation which modifies the stored images from the pre-relocation images $420_1$–$420_M$ to a post-relocation images $450_1$–$450_M$, respectively.

Figure 5:
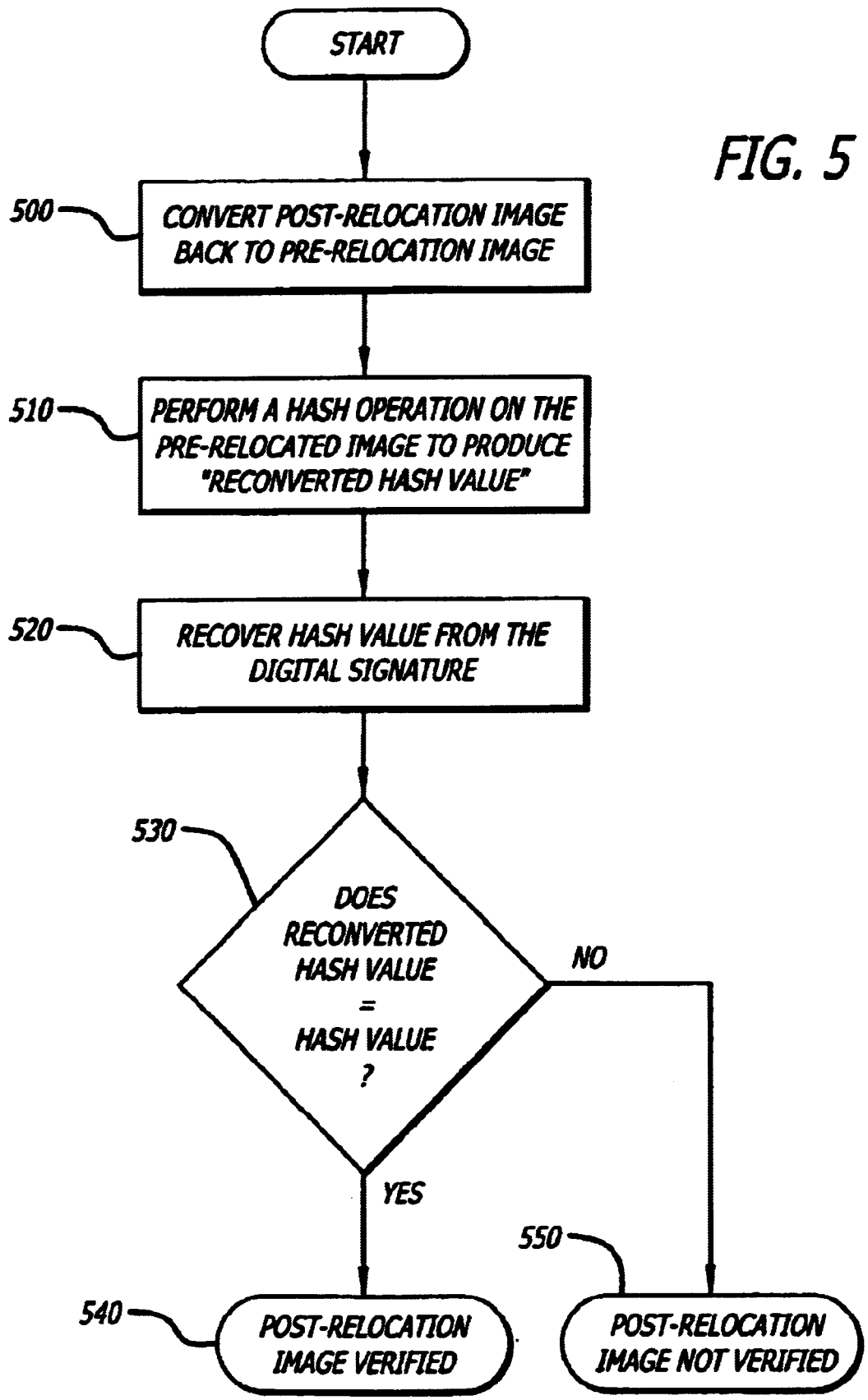
FIG. 5 is a flowchart of the operations for verifying the integrity of stored information, such as a post-relocation image shown in FIGS. 3 and 4.

Referring now to FIG. 5, a flowchart of the operations for verifying the integrity of stored information, such as a post-relocation image of FIGS. 3 and 4, is shown. For integrity verification, the post-relocation image of a digitally signed image is reconverted to a pre-relocation image (block 500). This is accomplished using the relocation information contained in the digitally signed image. In particular, one or more arithmetic operations are performed on each offset; namely, as an example, the base address associated with memory of the non-volatile memory component is subtracted from each offset set forth in the relocation information. Thereafter, in block 510, a hash operation is performed on the reconverted, pre-relocation image to produce a hash value (referred to as the "reconverted hash value").

The digital signature of the digitally signed image is accessed and the hash value of the digital signature is recovered (block 520). This may be accomplished by running the digitally signed image through the digital signature algorithm being provided with a public key of the signatory for decode purposes. Thereafter, the recovered hash value is compared to the reconverted hash value (block 530). If a match is determined, the post-relocation image has been verified (block 540). Otherwise, the post-relocation image has not been verified, indicating that the image has been modified beyond such modification caused by relocation (block 550).

Figure 6:
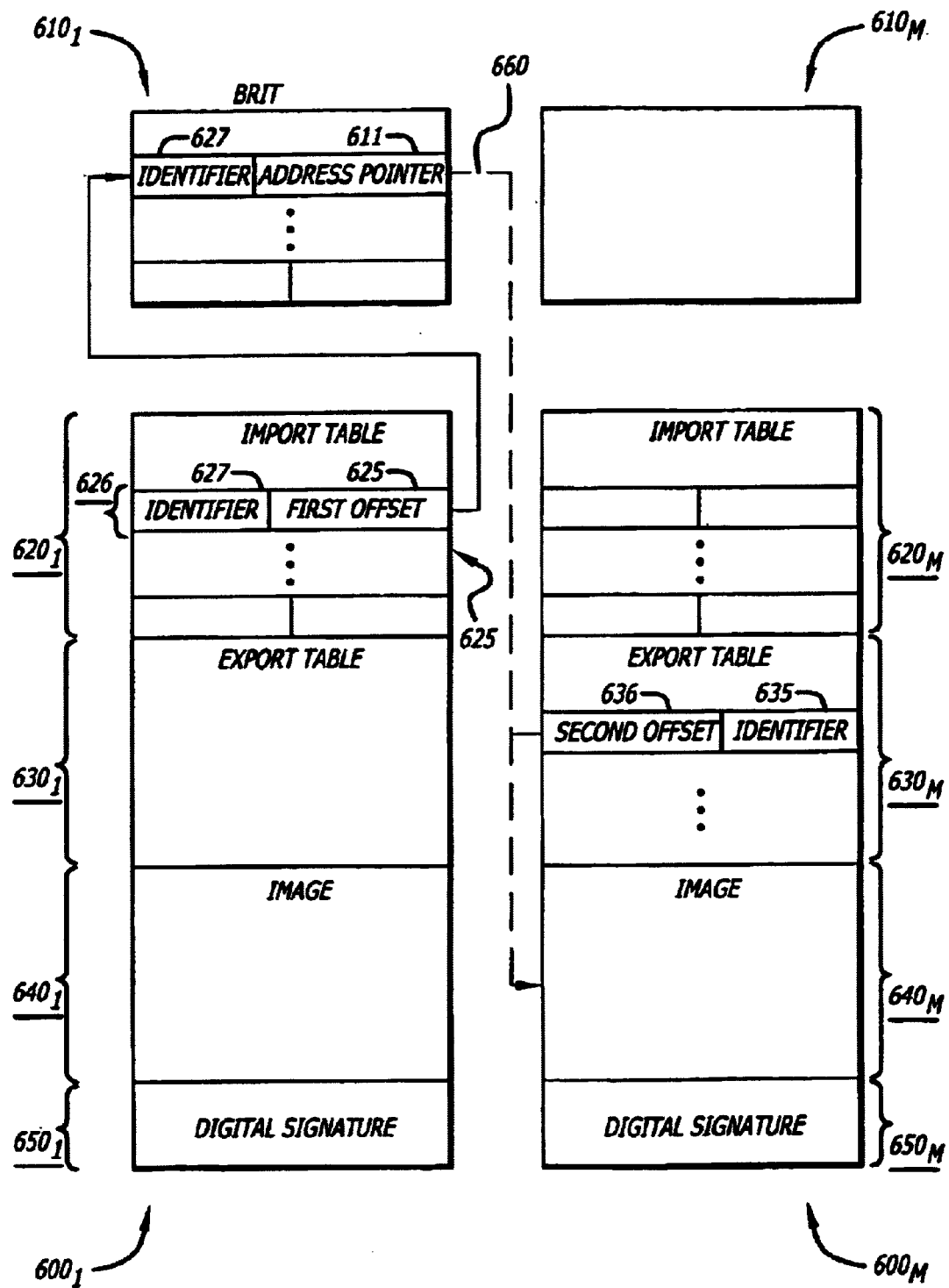
FIG. 6 is a block diagram of a second illustrative embodiment of the present invention featuring a plurality of digitally signed images are dynamically linked together through one or more Bound & Relocated Import Tables (BRITs).

FIG. 6 is a block diagram of a second illustrative embodiment of the present invention in which a plurality (M) of digitally signed images $600_1$–$600_M$ are dynamically linked together through one or more Bound & Relocated Import Tables (BRITs). Each BRIT corresponds to only one digitally signed image. It is contemplated that each digitally signed image $600_1$–$600_M$ may include a BRIT or only a subset of the digital signed images $600_1$–$600_M$ may be provided BRITs.

In this embodiment, a dynamic linking of two digitally signed images $600_1$, and $600_M$ is shown. Herein, the digitally signed image $600_1$ includes a BRIT $610_1$, an import table $620_1$, an export table $630_1$1, an image $640_1$ based on selected information (e.g., a software module) and a digital signature $650_1$. The digital signature $650_1$ is generated by conducting a one-way hash operation on the import table $620_1$, the export table $630_1$ and the image $640_1$ to produce a resultant hash value. The resultant hash value is digitally signed by a signatory using its private key.

In general, the import table $620_1$ is listing of stored information located in another digitally signed image (e.g., image $640_M$) that need to be accessed for proper execution of the image $640_1$. The import table $620_1$ comprises a plurality of entries 625 of which at least one entry (e.g., entry 626) of the import table 620 comprises an identifier 627 and a first offset 628. Generated either internally within the electronic device or remotely by a centralized authority, the identifier 627 indicates what segment(s) of information (e.g., a function, routine, code, data, etc.) not contained within the digitally signed image $600_1$, is required by the image $640_1$ during execution. The identifier 627 may be represented as an alphanumeric name or a guaranteed unique identification (e.g., a sixteen-byte value). The first offset 628 is an offset pointer to an entry of the BRIT 610 that corresponds to entry 626.

The export table 630 is a listing of information contained in a digitally signed image that are available for other digitally signed images to retrieve. Entries of the export table $630_M$, for example, include an identifier 635 for each segment of information included in the image $640_M$ and a second offset 636. The second offset 636 is equivalent to an offset from an address location of the digitally signed image $600_M$ to the address location of the segment of information required by image $640_1$ of the digitally signed image $600_1$.

As shown, the BRIT $610_1$ is associated with the digitally signed image $600_1$. Each entry of the BRIT $610_1$ includes the identifier 627 and an address pointer 611 of the location of the segment of information. The address pointer 611 is an arithmetic combination of the starting address of the image $640_M$ and the second offset 636. Thus, during execution of image $600_1$, a request for a segment of information referenced by the identifier 627 is routed via the BRIT $610_1$ to a location within the image $640_M$ as represented by dashed line 660. This enables the segment of information at that location to be accessed without modification of the image $640_M$. Thus, the digital signatures $650_1$ and $650_M$ can still be used to monitor modification of the import tables $620_1$ and $620_M$, export tables 630, and $630_M$, and/or images $640_1$ and $640_M$.

Figure 7:
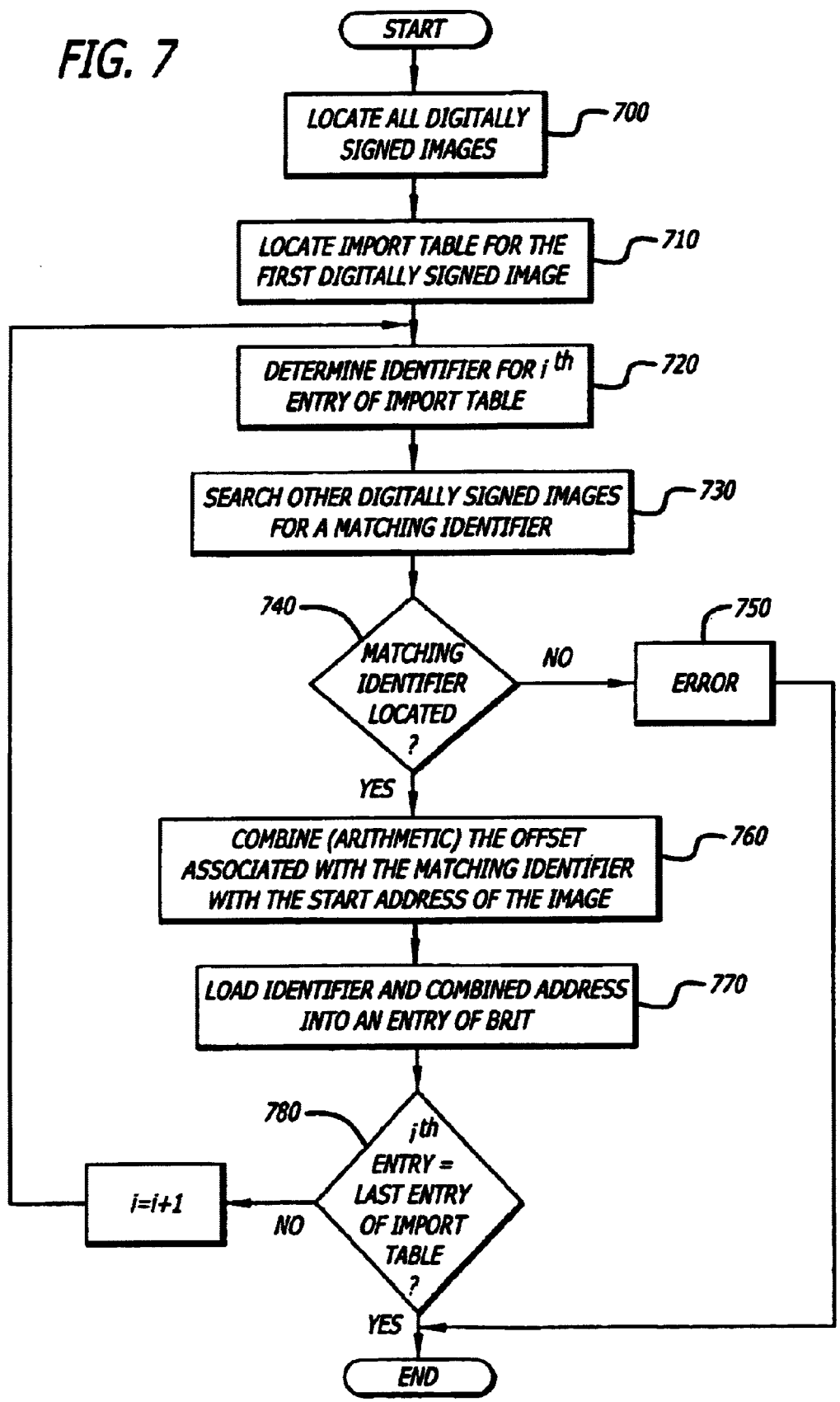
FIG. 7 is a flowchart of the operations for generating a Bound and Relocated Import Table (BRIT).

Referring now to FIG. 7, a flowchart of the operations for generating a Bound and Relocated Import Table (BRIT) of the first digitally signed image $600_1$ of FIG. 6 is shown. Initially, all digitally signed images within the non-volatile memory component are located (block 700). Thereafter, an import table of the first digitally signed image is located (block 710). For an initial entry of the import table, the identifier is determined and a search is conducted for a matching identifier in an export table of another digitally signed images, namely any other digitally signed image besides the first digitally signed image (blocks 720 and 730).

If the matching identifier is not located, an error is reported (blocks 740 and 750). If the matching identifier is located within a second digitally signed image, for example, the offset in the export table that corresponds to the matching identifier and resides in second digitally signed image is arithmetically combined with the starting address of the second digitally signed image (blocks 740 and 760). The combined address is loaded into an entry of the BRIT along with the identifier associated with the import table (block 770). This process continues until all entries in the import table have corresponding entries in the BRIT (block 780).

Figure 8:
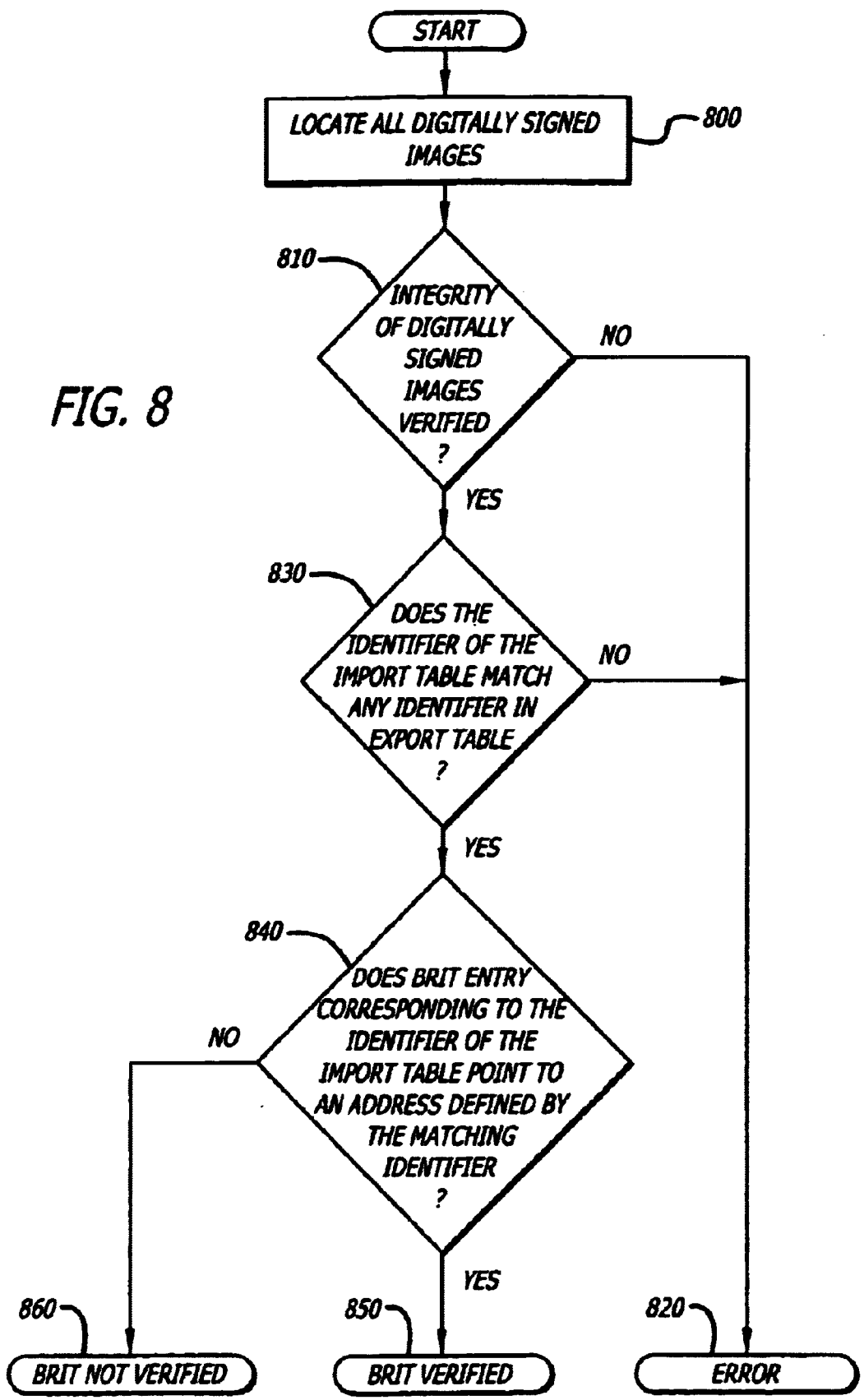
FIG. 8 is a flowchart of the operations for verifying the Bound and Relocated Import Table (BRIT) of FIG. 7.

Referring to FIG. 8, a flowchart of the operations for verifying the Bound and Relocated Import Table (BRIT) of FIG. 7 is shown. In this embodiment, a list of all digitally signed images is generated (block 800). For each digitally signed image, verify the integrity of these digitally signed images by confirming that its corresponding import table, export table and image have not been modified (block 810). For a first digitally signed image, for example, this can be accomplished by performing a hash operation on the import table, export table and image of the first digitally signed image. This produces a resultant hash value. The resultant hash value is compared with a hash value uncovered from the digital signature associated with the first digitally signed image. If the resultant hash value matches the recovered hash value, the import table, export table and image for the first digitally signed image have not been modified. This operation is continued for all of the remaining digitally signed images.

If the integrity of the digitally signed images cannot be verified, an error is reported (block 820). Otherwise, for the first digitally signed image, a determination is made whether the identifier in its import table matches an identifier in an export table of another digitally signed image (block 830). If no match is located, an error is reported (see block 820). If a match is located, a determination is made whether the BRIT entry corresponding to the identifier of the import table points to an address defined by the matching identifier of the export table of another digitally signed image (block 840). Since the BRIT can only point to an address defined by an export table that is contained in a digitally signed image, it can only point to trusted information. If the BRIT entry corresponding to the identifier of the import table points to an address defined by the matching identifier of the export table of another digitally signed image, the BRIT is verified (block 850). Otherwise, the BRIT is not verified (block 860).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. Embodied in a memory component, a digitally signed image comprising:
  a post-relocation image being a result formed by alteration of a pre-relocation image of a software module upon loading of the image into the memory component;
  information to convert the pre-relocation image to the post-relocation image, the information includes offsets for addressing routines within the software module and the offsets are generated after the software module is compiled and placed into an executable format; and
  a digital signature based on the pre-relocation image, the digital signature is a hash value of the pre-relocation image digitally signed by a private key of a selected signatory.

2. Embodied in a memory component, a digitally signed image comprising:
  a Bound & Relocated Import Table (BRIT);
  an import table;
  an export table including a plurality of entries forming a listing of segments of information contained in the image, a selected entry of the plurality of entries includes an identifier of a segment of information associated with the segments of information, the selected entry further includes a second offset being an offset from a starting address of the digitally signed image to an address location of the segment of information;
  an image of a software module; and
  a digital signature based on the import table, the export table and the image.

3. The digitally signed image of claim 2, wherein the import table comprises a plurality of entries, each entry includes an identifier that indicates what segment of information contained in another digitally signed image is required by the image.

4. The digitally signed image of claim 3, wherein the identifier includes a unique sequence of byte values.

5. The digitally signed image of claim 3, wherein the identifier includes a unique sequence of alphanumeric characters.

6. The digitally signed image of claim 3, wherein each entry of the import table further includes an offset to a corresponding entry of the BRIT.

7. A method comprising:
  reconverting a post-relocation image of a digitally signed image back to a pre-relocation image, the pre-relocation image being an image of a software module prior to relocation where an address with the digitally signed image is changed;
  conducting a one-way hash operation on the reconverted, pre-relocation image to produce a reconverted hash value;
  recovering a hash value from a digital signature contained in the digitally signed image, the hash value is based on the pre-relocation image of the software module;
  comparing the hash value to the reconverted hash value;
  determining that an integrity of the post-relocation image remains intact if the hash value matches the reconverted hash value; and
  determining that the post-relocation image has been modified beyond any modification caused by relocation when the hash value fails to match the reconverted hash value.

8. A method for generating a Bound & Relocated Import Table (BRIT) within an electronic device, comprising: (a) locating an import table for a first digitally signed image loaded within the electronic device, each entry of the import table including an identifier and a first offset; (b) accessing an identifier within a selected entry of the first digitally signed image; (c) determining whether the identifier matches an identifier within an export table of a second digitally signed image loaded within the electronic device, the identifier for the export table is stored with a corresponding second offset; and (d) upon determining that the identifier within the selected entry matches the identifier within the export table, producing an address by combining the second offset with a starting address of the second digitally signed image, and loading the identifier within the selected entry and the address into an entry of the BRIT.

9. The method of claim 8 further comprising: repeating the operations of (a)–(d) for each remaining entry of the import table for loading resultant address and identifier pairs into different entries of the BRIT.

10. The method of claim 8, wherein the; producing of the address by combining the second offset with the starting address of the second digitally signed image comprises an arithmetic operation.

11. The method of claim 8, wherein prior to locating an import table for the first digitally signed image, the method further comprises locating a plurality of digitally signed images loaded within the electronic device.

12. A method comprising:
   verifying an integrity of a plurality of digitally signed images loaded in an electronic device, the plurality of digitally signed images includes a first digitally signed image and a second digitally signed image by
      performing a hash operation on an import table, an export table and an image of the first digitally signed image to produce a first resultant hash value;
      recovering a first hash value from a digital signature contained in the first digitally signed image,
      comparing the first hash value with the first resultant hash value,
      performing a hash operation on the import table, the export table and an image of the second digitally signed image to produce a second resultant hash value;
      recovering a second hash value from a digital signature contained in the second digitally signed image, and
      comparing the second hash value with the second resultant hash value;
   determining whether an identifier in an import table of the first digitally signed image matches an identifier in the export table of the second digitally signed image; and
   determining whether an entry of a Bound & Relocated Import Table (BRIT) corresponding to the identifier in the import table points to an address defined by the identifier in the export table.

13. An electronic device comprising:
   a processor; and
   a non-volatile memory component in communication with the processor, the non-volatile memory component includes including
      a post-relocation image being an image of a software module altered during relocation in which an address associated with the image is adjusted before loading the post-relocation image into the memory component,
      information to convert the image into the post-relocation image, the information placed within the non-volatile memory component includes an offset from a starting address of the image of the software module, and
      a digital signature based on the image of the software module.

14. An electronic device comprising:
   a processor; and
   a memory in communication with the processor, the memory being loaded with a Bound & Relocated Import Table (BRIT), an import table, an export table, an image of a software module, and a digital signature based on the import table, the export table and the image, the export table includes a plurality of entries forming a listing of segments of information contained in the image, a selected entry of the plurality of entries includes an identifier of a segment of information associated with the segments of information, the selected entry further includes a second offset being an offset from a starting address of the digitally signed image to an address location of the segment of information.

15. The electronic device of claim 14, wherein the import table loaded within the memory comprises a plurality of entries, each entry includes an identifier that indicates what segment of information contained in another digitally signed image is required by the image.

16. The electronic device of claim 15, wherein the identifier associated with a particular entry include a unique sequence of byte values.

17. Embodied in a processor readable medium for execution by a processor, a software program comprising
   a first software module to reconvert a post-relocation image of a digitally signed image back to a pre-relocation image, the pre-relocation image being an image of a software module prior to adjustment of an address corresponding to an address location allotted for the post-relocation image;
   a second software module to conduct a hash operation on the reconverted, pre-relocation image to produce a reconverted hash value;
   a third software module to recover a hash value from a digital signature contained in the digitally signed image, the hash value is based on the image of the software module;
   a fourth software module to compare the hash value to the reconverted hash value;
   a fifth software module to determine that an integrity of the post-relocation image remains intact if the hash value matches the reconverted hash value; and
   a sixth software module to determine that the post-relocation image has been modified beyond any modifications caused by relocation when the hash value fails to match the reconverted hash value.

* * * * *

UNITED STATES PATENT AND TRADEMARK OFFICE
CERTIFICATE OF CORRECTION

PATENT NO. : 6,928,548 B1  
DATED : August 9, 2005  
INVENTOR(S) : Hale et al.

Page 1 of 1

It is certified that error appears in the above-identified patent and that said Letters Patent is hereby corrected as shown below:

Column 1,
Line 41, delete "30".

Column 5,
Line 24, delete "-with" and insert -- with --.

Column 6,
Line 2, delete "1".
Line 48, delete "630," and insert -- $630_1$ --.

Signed and Sealed this

Eighteenth Day of October, 2005

JON W. DUDAS  
*Director of the United States Patent and Trademark Office*